United States Patent [19]

Freeman

[11] Patent Number: 4,592,595
[45] Date of Patent: Jun. 3, 1986

[54] WHEEL CONSTRUCTION OF SHOPPING CARTS AND THE LIKE

[75] Inventor: Jerry Freeman, Mount Prospect, Ill.

[73] Assignee: UNR Lighting, Chicago, Ill.

[21] Appl. No.: 588,737

[22] Filed: Mar. 12, 1984

[51] Int. Cl.[4] ............................................. B60B 5/02
[52] U.S. Cl. ........................... 301/63 PW; 152/379.3; 152/380
[58] Field of Search ................... 301/63 PW, 5.3, 5.7; 152/379.3, 380

[56] References Cited

U.S. PATENT DOCUMENTS

| 1,576,924 | 3/1926 | Malloy | 152/379.3 |
|---|---|---|---|
| 2,083,766 | 6/1937 | Wittkopp | 152/379.3 |
| 3,387,894 | 6/1966 | Louik | . |
| 3,578,812 | 5/1971 | Taussig | 301/63 PW |
| 3,666,322 | 5/1970 | Pickron | 301/63 PW |
| 3,695,728 | 4/1970 | Haussels | 301/63 PW |
| 3,730,594 | 4/1971 | Zbikowski | 301/63 PW |
| 3,807,474 | 4/1973 | Wendt | 152/324 |
| 3,894,776 | 4/1973 | Black | 301/63 PW |
| 4,072,373 | 2/1978 | Black | 301/5.7 X |
| 4,095,846 | 6/1978 | Agins | 301/37 R |
| 4,135,763 | 1/1979 | Kosono | 301/5.7 |
| 4,217,944 | 8/1980 | Pascal | 152/323 |
| 4,318,204 | 5/1980 | Black | . |
| 4,358,162 | 11/1982 | Schneider | 301/63 PW |

FOREIGN PATENT DOCUMENTS 965560 6/1957 Fed. Rep. of Germany .

Primary Examiner—David A. Scherbel
Attorney, Agent, or Firm—Dressler, Goldsmith, Shore, Sutker & Milnamow, Ltd.

[57] ABSTRACT

A wheel construction especially adapted for use with a shopping cart and the like, including a wheel of a first relatively inexpensive material comprising a central hub defining a central opening providing an axis of rotation for the wheel, a rim, and web means connecting the rim and hub. The rim defines an outermost peripheral surface and adjoining surfaces merging into the peripheral surface. Further said rim defines a plurality of circumferentially spaced notches, each of the notches extending generally laterally of the rim and inwardly of the peripheral surface toward said hub, and providing undercuts. A generally U-shaped tread member of a second material, such as relatively more expensive polyurethane rubber, is molded to the rim. The tread member defines an outer tread surface, an inner tread surface confronting the peripheral surface, a plurality of projections substantially corresponding in shape to the notches to interlock in the notches, and a pair of lateral surfaces confronting the adjoining surfaces. The notches may be U-shaped and may extend across the entire width of the peripheral surface. The central opening includes sockets on each side of the hub, each receiving a resilient socket liner, each of which receives a bearing assembly.

7 Claims, 6 Drawing Figures

WHEEL CONSTRUCTION OF SHOPPING CARTS AND THE LIKE

BACKGROUND OF THE INVENTION

This invention relates to a wheel construction, such as a wheel construction to be used for grocery carts, dollies, hand trucks and the like, and more especially to wheel constructions for such carts including a hub, a central bearing assembly, a rim, a web connecting the rim and hub, and a tread on the rim.

A variety of wheel constructions having a tread positioned on the rim of a wheel are known. Many employ polyurethane rubber treads for its superior wearing qualities, for its long life, cushioning characteristics, resistance to abrasion, and resistance to weather deterioration. However, polyurethane rubbers are relatively expensive, as compared to typical wheel construction materials, such as polypropylene, and therefore it is important to minimize the amount of polyurethane used, while maximizing the effectiveness of the polyurethane, as by properly positioning it, and by wasting a minimum of it.

Typical composite wheel constructions which utilize a wheel having a central hub, web and rim, and a tread for the rim, as well as inserted or insertable bearings arrangements include those shown in U.S. Pat. Nos. 3,387,894; 3,578,812; 3,666,322; 4,072,373; 4,095,846; 4,135,763 and 4,217,944;.

A need remains for an efficiently manufactured, easily assembled, long-lived wheel construction, especially for shopping carts which are notoriously subject to heavy use and great abuse. It is, therefore, desirable to provide wheel constructions which have a tread of a long-lived material and a wheel rim which is made of a relatively inexpensive material, and one which rolls quietly on hard surfaces, resists abuse, as when the wheel is rammed into curbs or walls, resists undue transfer of shock loads to the associated bearings, and is long-lived.

It is therefore an object of the present invention to provide a wheel construction wherein a wheel comprising an interconnected hub and rim are formed of a first material, and the tread of the wheel is formed of another material, such as of polyurethane rubber. A further object is to provide an improved wheel construction wherein the tread is molded to and interlocked with the rim, thereby to permanently integrate it with the rim.

SUMMARY OF THE INVENTION

This invention provides an improved, composite wheel assembly, and one which is especially useful for shopping carts and the like. In particular, the improved wheel assembly comprises a wheel of a first relatively inexpensive material, such as of polypropylene or polyethylene. The wheel includes a central hub defining a central opening to provide an axis of rotation for the wheel, a rim, and a web means connecting the rim and the hub. The wheel, including the hub, rim and interconnecting web means, is of one-piece construction, which may be conveniently formed in a molding operation. The rim defines an outermost peripheral surface and adjoining side surfaces merging into the peripheral surface, and further defines a plurality of circumferentially spaced notch means. Each of the notch means extends generally laterally of the rim and radially inwardly of the peripheral surface toward the hub.

A tread member, which may be described as generally U-shaped in cross-section, of a second material, as of polyurethane rubber, is molded to the rim. The tread member defines an outer tread surface, defines an inner tread surface confronting the peripheral surface, defines a plurality of radially inwardly extending projections substantially corresponding in shape to the notch means, and further defines a pair of lateral surfaces confronting the adjoining surfaces. To enhance retention of the projections, the notch means are each undercut or narrower at the peripheral surface than inwardly thereof. The projections on the tread member are tapered from a relatively narrow portion adjacent the peripheral surface of the rim to a relative wide portion radially inwardly thereof, thereby cooperating with the undercut portions of the notch means to securely mechanically interlock the tread on the wheel.

In a presently preferred embodiment, each adjoining side surface of the rim defines a notch segment merging into a notch means thereby to define generally U-shaped, circumferentially spaced notches.

The wheel construction provides an improved bearing assembly as well. To that end, the central opening is of a first diameter and the hub defines a socket of a second larger diameter on each side of said central opening. Each said socket is proportioned to receive, retain and position a separate bearing assembly. Preferably each socket receives and retains a separate resilient socket liner which in turn receives, retains and positions the separate bearing assembly. Desirably, the socket liner is preformed, and is of a polyurethane rubber.

These and other and further objects, features and advantages of the present invention will become apparent from the following detailed description of presently preferred embodiments and from the drawings.

DESCRIPTION OF THE PREFERRED EMBODIMENT

Figure 1:
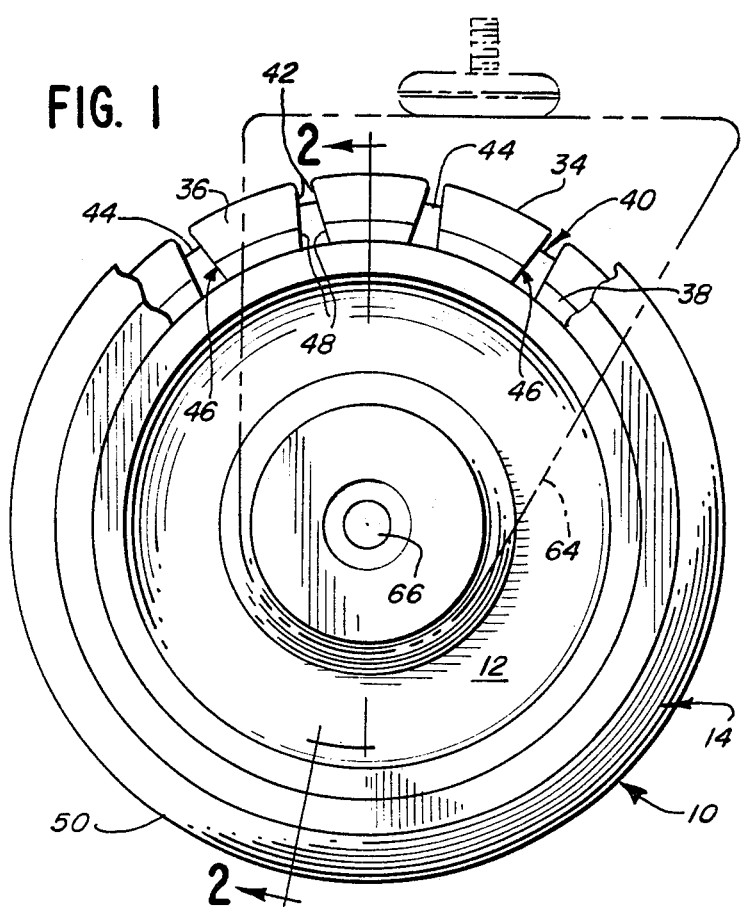
FIG. 1 is a side elevational view, with a portion broken away, of a wheel construction of the present invention.
Figure 2:
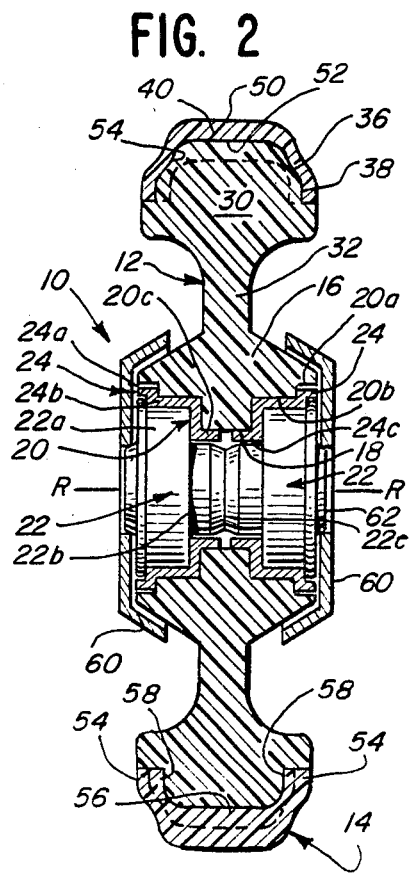
FIG. 2 is a cross-sectional view of the wheel construction of FIG. 1 taken substantially along line 2—2 of FIG. 1.
Figure 3:
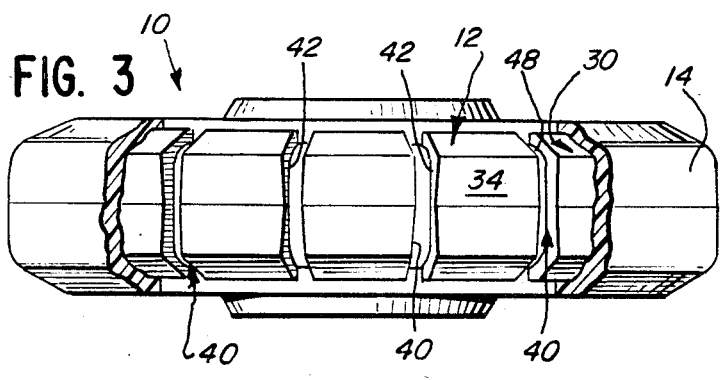
FIG. 3 is a plan view of FIG. 1.

Referring first to the presently preferred embodiment of FIGS. 1-3, a wheel construction 10 of the present invention is there shown. Wheel construction 10 comprises a wheel 12 of a first material, such as of polypropylene or polyethylene, and a tread 14 of a second material such as polyurethane rubber.

Wheel 12 comprises a central hub 16. Hub 16 defines a central opening 18 of a first diameter. On each side of the central opening 18, a socket 20 is provided. Sockets 20 are each proportioned to receive, retain and position a bearing assembly 22, each of which may be identical and of a known, conventional construction. Preferably, each socket receives and positions a resilient socket liner 24, which in turn receives a bearing assembly 22. Desirably, the socket cushions or liners are of a polyurethane rubber, and function as a cushion, to take up shock loads imposed upon the wheel. Bearing assemblies 22 each include an axially outermost first portion 22a, having an outwardly extending rim threrearound, a reduced diameter intermediate portion 22b, and a tapered axially innermost portion 22c. Socket 20 includes stepped portions 20a, 20b and 20c, which receive correspondingly stepped portions 24a, 24b and 24c of cushion 24, respectively. In the preferred construction, a cushion 24 is slip fit into its socket 20, and cushion portion 24b is stretched into a tight fit with socket portion 20b when the associated bearing assembly 22 is pressed into the liner 24 and assembly portion 22a forces cushion portion 24b outwardly. Bearing assembly portions 22c butt against one another, and are spaced radially inwardly of cushion portion 24c, as are assembly portions 22b. The ends of cushion portions 24c are spaced axially from one another, and cooperate with assembly portions 22b and 22c to define an air space at the center of the wheel.

When the wheel hub, liners and bearing assemblies are so assembled, the central opening 18 (and bearing assemblies) define an axis of rotation R-R for the wheel construction 10.

Hub 16 is integrally formed with a rim 30 via suitable web means, such as web 32. In the embodiment illustrated, web 32 is generally solid and of thinned cross-section (see FIG. 2) as compared to the hub 16 and rim 30. The web 32, however, may be spoke-like, or may be of other cross-sectional shapes and configurations known to those skilled in the art.

Rim 30 may be of about the same cross-sectional width as the hub 16, as is shown in FIG. 2. Rim 30 comprises an outermost peripheral surface 34 and adjoining lateral surfaces, such as sloping side surface segments 36, and depending or generally vertical side surface segments 38.

Rim 30 also defines a plurality of circumferentially spaced notch means 40 which extend generally laterally of the rim, i.e., generally parallel to the axis of rotation R-R of the wheel. Each of the notch means 40, in the illustrated embodiment, extends uninterruptedly across the rim 30 and is defined by a pair of spaced apart confronting surfaces 42 which are inclined inwardly and which diverge inwardly, as best seen in FIG. 1, toward notch base 44. The diverging surfaces provide a notch means which is narrower at the peripheral surface than inwardly thereof, i.e., of a key-like or undercut configuration, which, as will appear, assists in interlocking the tread with the rim. The surfaces 42 each define a very, very shallow V-shaped configuration having a included angle of perhaps 176 to 178 degrees (see FIG. 3). This shallow V-shape, as will appear, further assists in resisting movement of the tread 14 relative to the rim.

It is also clear that each of the side surfaces merging into the peripheral surface 34 defines notch segments 46. Segments 46 are defined by confronting inwardly-extending, inwardly diverging rim surfaces 48 for a purpose to be described. Notch segments 46 and notch means 40 together define a generally U-shaped notch, a plurality of which notches are circumferentially spaced about the periphery of the rim. The notch, in cross-section, widens from the peripheral surface inwardly, thereby to enhance its retentive characteristics, as will be explained.

As best seen in FIG. 2, tread 14 may be loosely referred to as generally U-shaped in cross-section. It defines an outer tread surface 50, an inner tread surface 52 which confronts the peripheral rim surface 34, and a pair of lateral surfaces or edges 54. Lateral edges 54 conform generally to the shape of surface segments 36, 38, whereas inner tread surface 52 conforms to the shape of peripheral surface 34. The U-shaped tread embraces the rim 30.

As stated, the tread is formed by molding it in place, i.e., by molding the polyurethane into the configuration shown in the drawings directly against the rim 30. Thus, by placing the rim in juxtaposition with a mold member, molten polyurethane rubber is injected into the cavity thus defined, and the assembly is cooled to cool and shrink the polyurethane, thereby to mechanically interlock the tread with the wheel. During the molding procedure, the polyurethane not only assumes the external tread configuration shown in the drawings (and as defined by the mold shape) but also assumes an interal tread configuration corresponding to the surface configuration of the rim. Thus, the notch means are substantially filled with polyurethane projections which are integral with tread interior surfaces. In particular, projections 56 correspond in shape to the undercut notch means 40. A pair of projection segments 58 merge into and with each projection 56 to form a generally U-shaped projection. Of course, the projections may be segmental if the notch means are segmental.

Thus, in the embodiment of FIGS. 1-3, an improved wheel construction for a shopping cart or the like is provided, and with a molded in-situ tread which is permanently, mechanically interlocked with the rim, and which is resistant to lateral and circumferential movement relative to the rim. Further, the use of the polyurethane tread 14 and liners 24 promotes a relatively shock-free, long-lived wheel construction, enhancing the life expectancy of the associated shopping cart.

Desirably, the wheel assembly may be provided with a pair of string guards 60 which may be snap secured to the hubs 62 of bearing assemblies 22. That assembly is then mounted, via a conventional U-shaped caster frame 64 and axle 66 and is ready to be secured to a shopping cart or the like.

Figure 4:
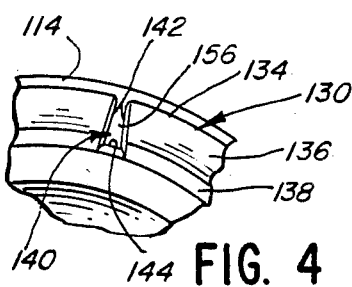
FIG. 4 is a fragmentary view of a modified wheel construction of the present invention.
Figure 6:
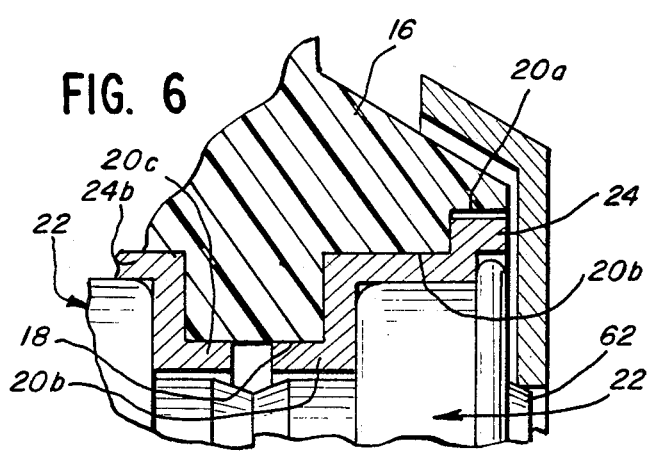
FIG. 6 is an enlarged portion of FIG. 2.
Figure 5:
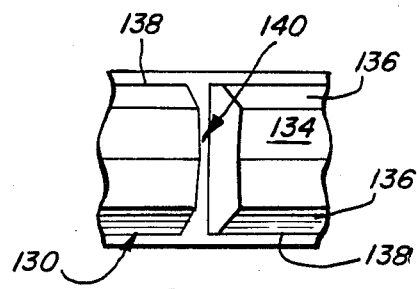
FIG. 5 is a plan view of the modified wheel construction of FIG. 4.

Referring now to FIGS. 4 and 5, these show fragmentary portions of a wheel construction like that of FIGS. 1 to 3. Thus the embodiment of FIGS. 4 and 5, like FIG. 1, includes a wheel construction, in this case having a rim 130, having a peripheral surface 134, sloping adjoining side surfaces 136 and generally vertical adjoining side surfaces 138. Circumferentially spaced notch means 140 are provided. Notch means 140 extend across the rim 130 and are defined by a pair of spaced, confronting surfaces 142 which are inclined inwardly and which diverge inwardly, as best seen in FIG. 4, toward notch base 144. The diverging surfaces provide a notch means which is undercut, i.e., which is narrower at the peripheral surface than inwardly thereof, thereby to assist in interlocking an associated tread 114 (shown as transparent in FIG. 4) with the rim 130.

In this embodiment, the notches extend the full width and depth and therefore, the surfaces of the rim 130 adjoining the peripheral surface do not define separate notches, as was the case with the embodiment of FIGS. 1-3. Since the notches are of full depth and width, more polyurethane rubber is required to form projections 156 in the embodiment of FIGS. 4 and 5, but without significantly enhanced interlocking. For that reason, the embodiment of FIGS. 1-3 is preferred.

Although but two embodiments have been illustrated and described in detail, it will be apparent to those skilled in the art that modifications may be made without departing from the spirit and scope of the present invention. As such, the scope of the patent is to be construed in accordance with the appended claims.

What is claimed is:

1. A wheel construction comprising
    a wheel of a first material comprising a central hub providing a central opening defining an axis of rotation for said wheel, a rim disposed radially outwardly of said hub, and web means connecting said rim and said hub,
    said rim defining an outermost peripheral surface and adjoining surfaces disposed radially inwardly of said outermost peripheral surface and merging into said peripheral surface,
    said rim further defining a plurality of circumferentially spaced notch means, each said notch means extending generally laterally of said rim and inwardly of said peripheral surface toward said hub, each said adjoining surface defining a plurality of notch segments each merging into a respective one of said notch means to provide a plurality of circumferentially spaced notches, each said notch segment being defined by a respective pair of inwardly-extending, inwardly diverging rim surfaces, and
    a tread member of a second material molded to said rim, said tread member being generally U-shaped in cross-section and defining an outer tread surface and an inner tread surface confronting said peripheral surface, said tread member defining a plurality of radially inwardly extending projection means substantially corresponding in shape to said notch means, and said tread member further defining a pair of radially inwardly extending lateral surfaces confronting said adjoining surfaces, and said tread member including a plurality of circumferentially spaced projection segments on each of said lateral surfaces, said projection segments respectively extending into and corresponding in configuration to said notch segments for interlocking said tread member to said rim.

2. A wheel construction in accordance with claim 1 wherein said notch means extends across the full width of said outermost peripheral surface, and each said projection means extends across the full width of said inner tread surface, said projection means and said projection segments thereby defining a plurality of circumferentially spaced U-shaped projections.

3. A wheel construction in accordance with claim 1 wherein said notch means define undercut means to enhance retention of said projection and to interlock said tread with said rim.

4. A wheel construction in accordance with claim 3 wherein said undercut means comprises spaced confronting surfaces defining said notch means, said notch means being narrower at said peripheral surface than inwardly thereof, and said confronting surfaces diverging inwardly of said rim, thereby to enhance retention of said projection means and said tread.

5. A wheel construction in accordance with claim 1 further comprising a pair of bearing assemblies, and wherein said central opening is of a first diameter and said hub defines a socket of a second larger diameter on each side of said central opening, and wherein each said socket is proportioned to receive, retain and position one of said pair of bearing assemblies.

6. A wheel construction in accordance with claim 5 further comprising a pair of resilient socket liners, and wherein each said socket receives and retains a said socket liner which in turn receives, retains and positions a said bearing assembly in a said socket.

7. A wheel cons,truction in accordance with claim 6 wherein said tread and said socket liners are of polyurethane rubber.

* * * * *

UNITED STATES PATENT AND TRADEMARK OFFICE
CERTIFICATE OF CORRECTION

PATENT NO. : 4,592,595

DATED : June 3, 1986

INVENTOR(S) : Jerry Freeman

It is certified that error appears in the above-identified patent and that said Letters Patent is hereby corrected as shown below:

Column 6, line 14, after the word "projection", insert the word "means";

Column 6, line 36, the word "con,struction" should be "construction".

Signed and Sealed this

Twenty-sixth Day of August 1986

[SEAL]

Attest:

DONALD J. QUIGG

Attesting Officer

Commissioner of Patents and Trademarks